(No Model.) 2 Sheets—Sheet 1.
N. E. POWERS.
CAPE COLLAR.
No. 408,849. Patented Aug. 13, 1889.
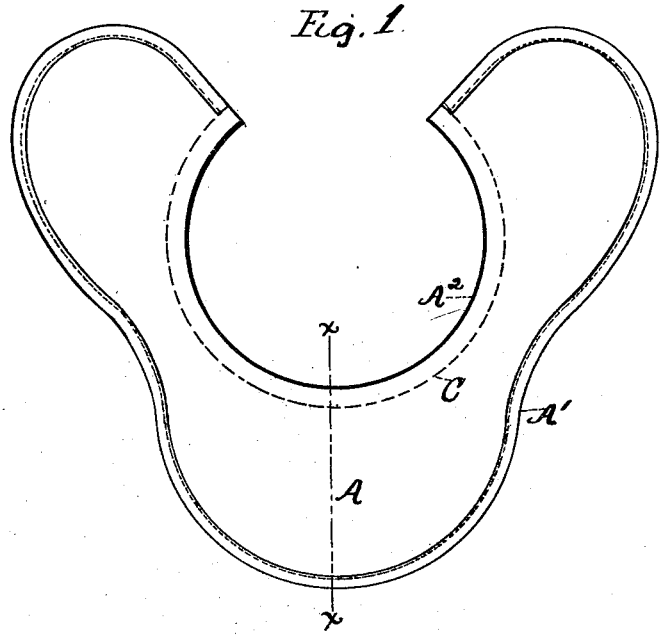
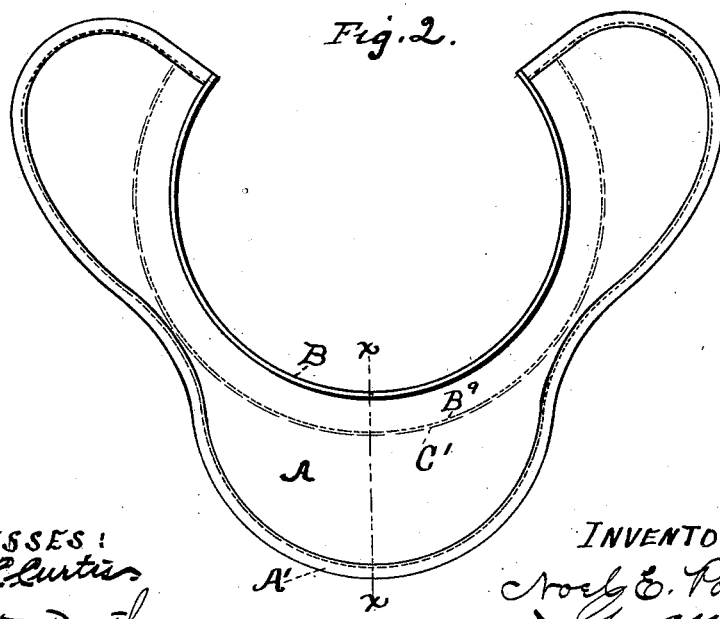
WITNESSES:
Frank C. Curtis
John T. Booth
INVENTOR:
Noel E. Powers
by Geo. A. Mosher
atty.

(No Model.) 2 Sheets—Sheet 2.
N. E. POWERS.
CAPE COLLAR.
No. 408,849. Patented Aug. 13, 1889.
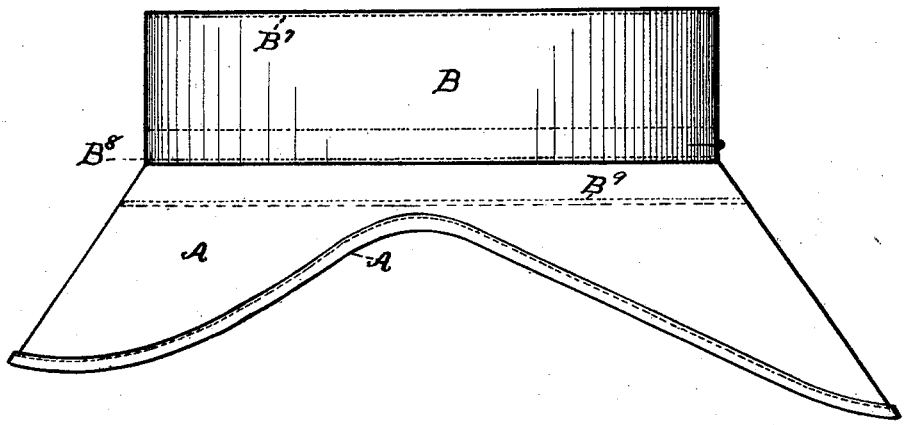
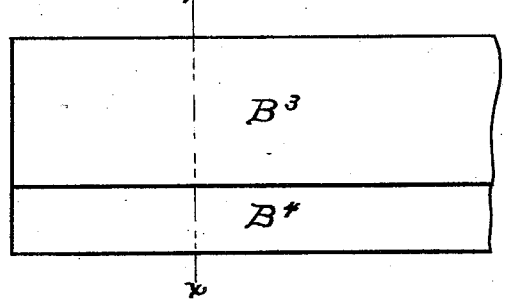
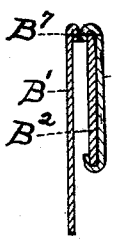 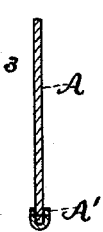 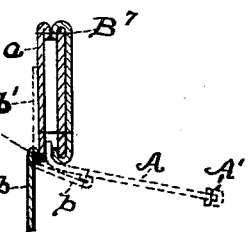 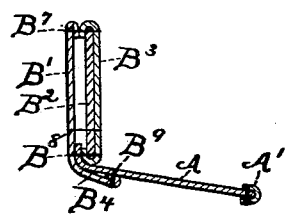
WITNESSES:
Frank C. Curtis
John T. Booth
INVENTOR:
Noel E. Powers
by Geo. M. Osher
atty.

UNITED STATES PATENT OFFICE.

NOEL E. POWERS, OF LANSINGBURG, ASSIGNOR TO WILBUR, MILLER & WILBUR, OF TROY, NEW YORK.

CAPE-COLLAR.

SPECIFICATION forming part of Letters Patent No. 408,849, dated August 13, 1889.

Application filed April 29, 1889. Serial No. 308,921. (No model.)

*To all whom it may concern:*

Be it known that I, NOEL E. POWERS, a resident of Lansingburg, in the county of Rensselaer and State of New York, have invented certain new and useful Improvements in Cape-Collars; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in cape-collars; and it consists of the novel construction and combination of parts hereinafter described, and pointed out in the claims.

Figure 1 of the drawings is a top plan view of the cape detached from the collar proper and laid out flat. Fig. 2 is a similar view of the cape attached to the collar proper. Fig. 3 represents a side elevation, upon an enlarged scale, of the completed collar, showing the relative position of its parts while in use upon the neck of the wearer. Fig. 4 is a plan view showing the outer or face side of the collar proper as it would appear when laid out flat before the cape is attached. Fig. 5 is a cross-section of the unfinished collar proper, taken on the broken line $x\ x$ in Fig. 4. Fig. 6 is a cross-section of the detached cape, taken on the broken line $x\ x$ in Fig. 1. Fig. 7 is a cross-section similar to that in Fig. 5, showing a modified form of lapping ply. Fig. 8 is a cross-section of the collar completed, taken on the broken line $x\ x$ in Fig. 2.

The cross-sectional views are somewhat exaggerated in form and size for convenience in illustration.

The collar proper may be of any known form of lady's collar made up of one or more plies of fabric, but having one ply wider than the collar proper, so that it projects below the lower edge of such collar.

The collar herein shown and described is in some particulars — which will be fully pointed out and described — thought to be an improvement upon the collar described and claimed in my prior application, Serial No. 306,788, for United States patent, to which application reference may be had in arriving at a full understanding of the nature and objects of the invention hereinafter claimed.

The collar described in my said application, Serial No. 306,788, comprised a cape with a curved or concaved edge and a collar proper formed of a plurality of fabric plies, one of which plies was wider than the others, whereby it projected below the lower edge of the collar proper. The curved edge of the cape was stitched to the comparatively straight edge of the collar proper, and the projecting collar-ply lapped the cape and was notched, and the cape-lapping sections formed by the notches were spring-stitched to the cape. The collar-plies, being formed of strips of fabric cut approximately on a line with its warp or woof, required to have the cape-lapping ply divided by notches or slits into comparatively short sections, as the strips or plies so cut could not be stretched or sprung sufficiently to make the straight edge of the lapping strip correspond in length with the greater length of a line drawn upon the cape parallel with the collar proper and at a distance therefrom equal to the width of the lapping portion of the collar-ply, upon which line the edge of the lapping ply is required to be stitched.

I have discovered that by cutting the lapping ply on the bias—that is, on a line diagonal to the warp and woof—the lapping edge can be stitched or sprung sufficiently to make its lapping straight edge correspond with the length of the lapped cape at the required distance from the collar proper without slitting or notching the lapping portion, thus doing away with the labor expended in notching and finishing the notched edges and improving the appearance of a one-piece cape.

A is the cape, which may have a binding-strip A' around its outer edge. Its inner edge is cut to form a sharp curve described by the circular line $A^2$.

The collar proper B is shown formed of three plies $B'$, $B^2$, and $B^3$. The plies $B'$ and $B^2$ are turned in at their upper edge and all three plies secured together by a line of stitching B⁷. The ply B' is made wider than the other plies to produce an extended or cape-lapping portion B⁴, and is formed by cutting off on the bias from a piece of fabric a strip of the desired width and length.

The inner curved edge A² of the cape is inserted between the lower folded-in edges of ply B³ and ply B', as shown in Fig. 8, and secured therein by the line of stitching B⁸, whereby the cape is made to flare or project angularly to the collar proper, substantially as shown in Figs. 2 and 8, and in a well-known manner. The extent of the insertion of the edge of the cape is represented by the circular broken line C, and the length of this line corresponds with the length of the collar-plies. The cape-lapping edge of the bias-cut ply is then finish-folded and spring-stitched to the cape by the circular line of stitching B⁹, the broken line C' representing the edge.

It is apparent from inspection of Figs. 1 and 2 that the circular broken line C' is longer than the circular broken line C, which latter line represents the length of the bias-cut ply. It follows, therefore, that the cape-lapping edge of the bias-cut ply must be sprung or stretched, so as to increase its length from that of collar B or line C to that of line C'. The ply being cut on the bias can be very easily stretched or sprung the required distance by the operator of the sewing-machine while the line of stitching B⁹ is being inserted by the machine. This operation of stretching and stitching I term "spring-stitching."

The wider ply B' may be cut in one integral piece or strip, as represented in Fig. 5, or in two pieces or strips, as represented in Fig. 7. When cut in two strips, one strip $a$ would be preferably cut like the other collar-plies, only the strip $b$ being cut on the bias. The strip $b$ would be laid upon the strip $a$ in the position indicated by the dotted line $b'$, secured thereto by the run seam S, turned down to substantially the position indicated by the solid lines $b$, whereupon the cape would be inserted and the collar finished, as before described, and indicated by dotted lines in said Fig. 7. As there is considerable waste in cutting fabric on the bias, a saving would be effected by thus cutting the wider ply in two strips, the cape-lapping portion only being cut on the bias.

What I claim as new, and desire to secure by Letters Patent, is—

1. In a cape-collar, the combination, with the collar part having an approximately straight edge and the cape part having a concaved edge, such parts being secured together by a line of stitching along such edges, of a re-enforce strip having its longitudinal edges cut on the bias approximately straight and parallel with each other, secured to the collar part by a line of stitching along one of such edges and to the cape part by another line of stitching along the other of such edges.

2. A cape-collar consisting of the collar proper formed of a plurality of approximately straight edge plies, one of which plies extends below the bottom edge of such collar proper and is composed of two approximately straight edge strips of fabric united with each other along one edge, the strip forming the extended or cape-lapping portion of the ply being cut on the bias, and the cape formed of a ply of fabric having its inner edge concaved or curved, all of said plies being fastened together by a line of stitching along the lower straight edge of the collar proper and the inner curved edge of the cape, the extended collar-ply lapping the cape and having its lapping edge secured to the cape-body by a line of stitching along the edge of the lapping ply, substantially as described.

In testimony whereof I have hereunto set my hand this 27th day of April, 1889.

NOEL E. POWERS.

Witnesses:
FRANK C. CURTIS,
CHAS. L. ALDEN.